United States Patent
Koch et al.

(10) Patent No.: US 7,088,341 B2
(45) Date of Patent: Aug. 8, 2006

(54) SYSTEM AND METHOD FOR INPUTTING SPECIAL CHARACTERS

(75) Inventors: Zeke Koch, Seattle, WA (US); Maurizio Cibelli, Seattle, WA (US); Jason William Fuller, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 10/402,877

(22) Filed: Mar. 27, 2003

(65) Prior Publication Data

US 2004/0075648 A1 Apr. 22, 2004

Related U.S. Application Data

(60) Provisional application No. 60/420,312, filed on Oct. 21, 2002.

(51) Int. Cl.
*G09G 5/00* (2006.01)
(52) U.S. Cl. .......................... 345/169; 345/171; 341/23
(58) Field of Classification Search ................ 345/169, 345/171–172; 341/22–23
See application file for complete search history.

(56) References Cited

U.S. PATENT DOCUMENTS

| | | | | |
|---|---|---|---|---|
| 5,231,581 A | | 7/1993 | Garneau et al. ............. | 364/419 |
| 5,288,158 A | * | 2/1994 | Matias ........................ | 400/472 |
| 5,574,447 A | * | 11/1996 | Roylance ..................... | 341/22 |
| 5,661,476 A | * | 8/1997 | Wang et al. .................. | 341/22 |
| 6,198,474 B1 | * | 3/2001 | Roylance ..................... | 345/168 |
| 6,320,519 B1 | * | 11/2001 | Hsu et al. ..................... | 341/23 |
| 6,370,531 B1 | | 4/2002 | Boutcher et al. ............. | 707/10 |
| 6,396,482 B1 | * | 5/2002 | Griffin et al. ................ | 345/169 |
| 2001/0013859 A1 | * | 8/2001 | Roylance ..................... | 345/168 |
| 2001/0050675 A1 | * | 12/2001 | O'Leary ...................... | 345/169 |
| 2003/0119551 A1 | * | 6/2003 | Laukkanen et al. ......... | 455/556 |

OTHER PUBLICATIONS

Chok-Ho Ip, Daniel M. Berry and Kam Pui Chow; "CWPR, A Chinese/Japanese Word-Processing System for Use with the Unix™ Device-Independent *TROFF* System"; The Second International Conference on Computers and Applications, Beijing (Peking), Peoples Republic of China, Jun. 23-27, 1987; pp. 570-577.

* cited by examiner

*Primary Examiner*—Richard Hjerpe
*Assistant Examiner*—M. Fatahiyar
(74) *Attorney, Agent, or Firm*—Merchant & Gould P.C.

(57) ABSTRACT

This invention provides a system and method for a user of a mobile computing device to input special characters using a modifier key on a keyboard. The special characters include accented characters associated with regular characters. In one aspect, a computer-implemented method for configuring a mobile computing device for a user to enter special characters is provided. The computer-implemented method includes inputting a regular character in response to a user pressing a key associated with the regular character. After the regular character has been inputted, the user may input a special character by pressing a modifier key. A special character associated with the regular character is determined in response to the user pressing the modifier key. The special character may be determined based on the number of times that the user has pressed the modifier key. The inputted regular character is then modified to the special character.

28 Claims, 6 Drawing Sheets

SYSTEM AND METHOD FOR INPUTTING SPECIAL CHARACTERS

CLAIM OF PRIORITY

This application claims the benefit of U.S. Provisional Application No. 60/420,312, filed on Oct. 21, 2002.

BACKGROUND OF THE INVENTION

Mobile computing devices are becoming increasing popular for both business users and casual users. Many of these mobile computing devices can rival desktop computers in capabilities and computing power. However, because of the emphasis on mobility, mobile computing devices generally do not include a full size keyboard for inputting text. Although some existing mobile computing devices include a miniature keyboard for entering text, this kind of miniature keyboard only has a limited number of keys that are barely adequate for entering the letters of the alphabet. To enter special characters such as symbols, accented characters, punctuation marks, and the like, existing mobile computing devices typically require a user to perform non-intuitive and cumbersome steps. An efficient and intuitive system and method that enable a user to input special characters in a mobile computing device continue to elude those skilled in the art.

SUMMARY OF THE INVENTION

Briefly stated, this invention enables a user of a mobile computing device to input special characters using a modifier key on a keyboard. The special characters include accented characters associated with regular characters. In one aspect, the invention is directed to a computer-implemented method for configuring a mobile computing device for a user to enter special characters. The computer-implemented method includes inputting a regular character in response to a user pressing a key associated with the regular character. After the regular character has been inputted, the user may input a special character by pressing a modifier key. A special character associated with the regular character is determined in response to the user pressing the modifier key. The special character may be determined based on the number of times that the user has pressed the modifier key. The inputted regular character is then modified to the special character.

In another aspect, the invention is directed to a special character table used by a mobile computing device for determining a special character. The special character table includes a first and second data fields. The first data field contains regular character identifiers. Each regular character identifier identifies a regular character that corresponds to an input responsive to pressing a key on a keyboard. The second data field contains entries. Each entry is indexed to a regular character identified in the first data field. Each entry includes a special character identifier that identifies a special character that corresponds to another input responsive to pressing a modifier key on the keyboard.

In yet another aspect, the invention is directed to a computing device that includes a keyboard and a memory. The keyboard has keys associated with regular characters and a modifier key. The memory is encoded with a character input engine configured to input a regular character when a key is pressed. The character input engine is also configured to determine a special character when the modifier key is pressed and modifying the inputted regular character to the special character In still another aspect, the invention is directed to a mobile computing device configured to enable a user to input a special character related to a regular character. The steps performed by the user to input the special character include inputting the regular character by pressing a key associated with the regular character and modifying the regular character to the special character by pressing a modifier key.

DETAILED DESCRIPTION OF THE PREFERRED EMBODIMENT

The inventors of the present invention have determined that a mobile computing device that enables a user to input special characters in an efficient and intuitive manner will significantly enhance the user experience. The inventors have also appreciated a computing device that enables a wide range of special characters to be quickly entered will considerably broaden the types of applications that can be executed on the device and the types of languages that are supported by the applications. Thus, the present invention focuses on a system and method for inputting special characters in a mobile computing device using a modifier key. The manner in which special characters are inputted in accordance with the present invention is very different from conventional methods. To input special characters on some mobile computing devices, users are required to use a special menu on a user-interface. This method of inputting special characters is time-consuming for the users and resource intensive for the mobile computing device. Other mobile computing devices require users to press multiple keys at the same time to enter a special character. Pressing multiple keys is often difficult for users to perform, especially on a small keyboard found on many mobile computing devices. Also, the use of key press combinations can only support a limited number of special characters and require users to remember those combinations in order to use them efficiently.

In contrast, the present invention provides a more user-friendly approach. The present invention provides an intuitive and efficient system and method for inputting special characters using a modifier key on a keyboard. Special characters may be selected and inputted by pressing the modifier key one or more times. The present invention enables a user to quickly enter special characters in a mobile computing device without undue effort and training. These and other aspects of the invention will become apparent after reading the following detailed description.

Figure 1:
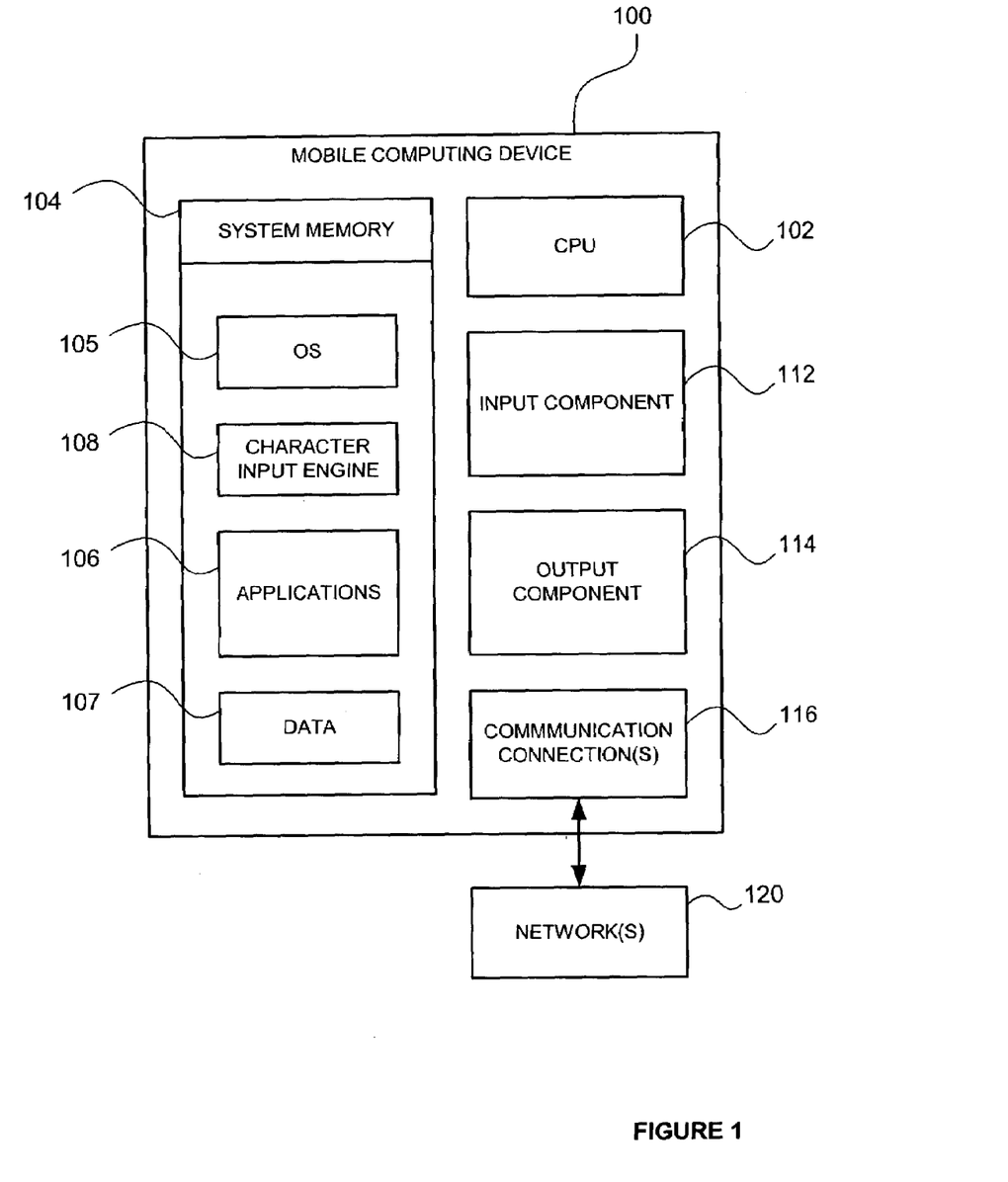
FIG. 1 illustrates an exemplary mobile computing device that may be used in one exemplary embodiment of the present invention.

FIG. 1 illustrates an exemplary mobile computing device that may be used in one exemplary embodiment of the present invention. With reference to FIG. 1, one exemplary system for implementing the invention includes a mobile computing device, such as mobile computing device 100. It is to be understood that many different kinds of mobile computing devices may implement this invention. These mobile computing devices include personal digital assistants, communication devices such as wireless phones and portable communication devices, portable video gaming units, and the like. For illustrative purposes, a general mobile computing device 100 will be described. A mobile computing device that is capable of implementing this invention may have more, less, or different components as those shown in FIG. 1.

Mobile computing device 100 may include various hardware components. In a very basic configuration, mobile computing device 100 typically includes a central processing unit 102 and system memory 104. Depending on the exact configuration and type of mobile computing device, system memory 104 may include volatile memory, non-volatile memory, data storage devices, or the like. These examples of system memory 104 are all considered computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by mobile computing device 100. Any such computer storage media may be part of device 100.

Mobile computing device 100 may contain output component 114 for displaying data to users. Mobile computing device 100 may also contain input component 112 for inputting characters. In particular, input component 112 may include a compact keyboard. Compact keyboard will be discussed in more detail in conjunction with FIG. 2. Briefly stated, a compact keyboard is a key-based input component that is designed for mobile computing devices.

Mobile computing device 100 may also contain communication connections 116 that allow the device to communicate with other mobile computing devices over network 120, such as a wireless network, local area network, wide area network such as the Internet, and other communication networks. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Software components of mobile computing device 100 are typically stored in system memory 104. System memory 104 typically includes an operating system 105, one or more applications 106, and data 107. As shown in the figure, system memory 104 may also include a character input engine 108. Character input engine 108 is a software component that handles character input for mobile computing device 100. It may be incorporated into the operating system 105 or applications 106, or it may be a stand-alone component. Character input engine 108 is configured to enable a user to input special characters using a compact keyboard. Special characters may include symbols, accented characters, punctuation marks, numbers, and the like.

Figure 2:
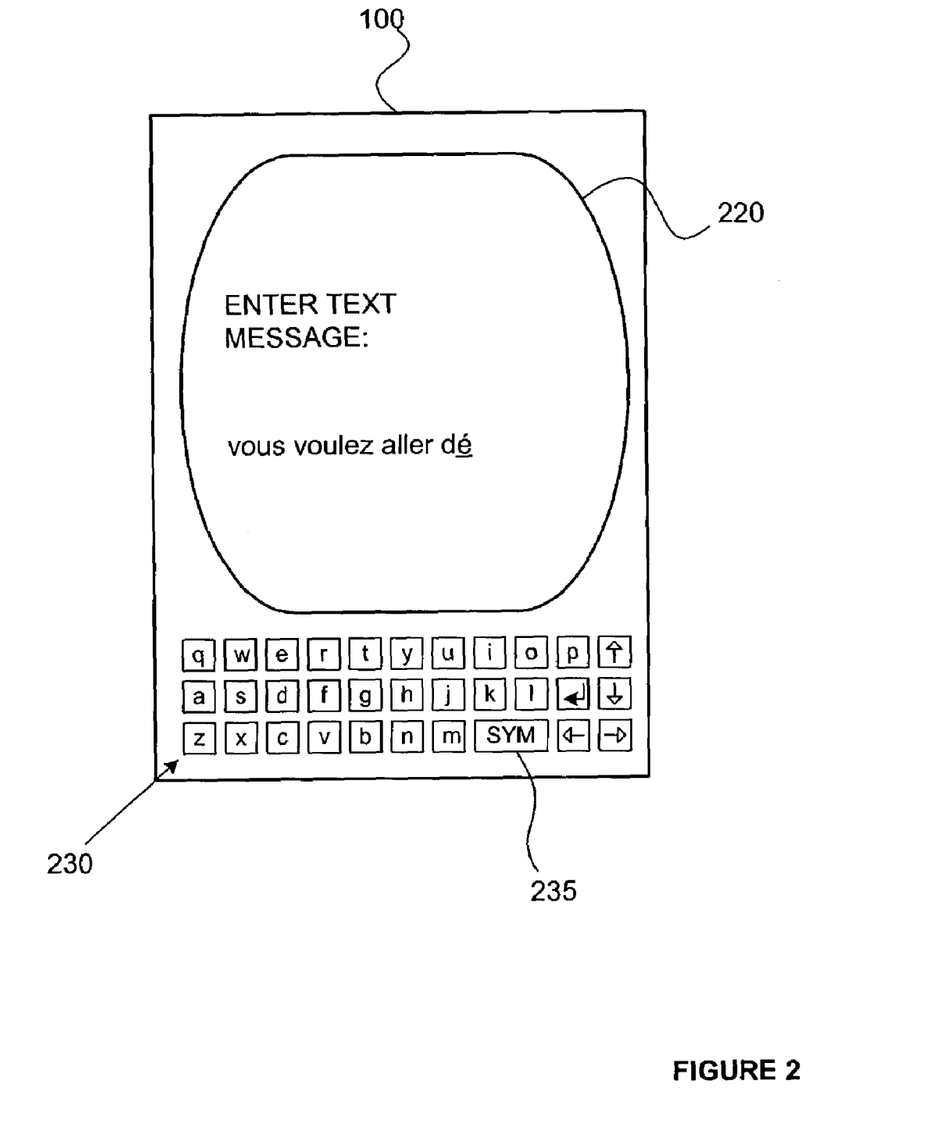
FIG. 2 shows mobile computing device 100 in FIG. 1 in more detail.

FIG. 2 shows mobile computing device 100 in FIG. 1 in more detail. As shown in the figure, mobile computing device 100 includes a display screen 220 and a compact keyboard 230. Compact keyboard 230 includes any key-based input component that can provide an input signal associated with a character to mobile computing device 100 in response to a key press. Display screen 220 includes any component for displaying information for mobile computing device 100. Display screen 220 shows that a messaging application is executing on mobile computing device 100. A user is composing a message in French by inputting each character of the message. The user may input regular characters by pressing one of the keys on compact keyboard 230. However, to compose the message properly in French, the user is required to input a special character, which is the accented "é". Compact keyboard 230, because of its small size, does not have a key designated for inputting "é" or other special characters with only one key press.

The present invention enables the user to input special characters by using modifier key 235. The user may enter a special character by scrolling through a set of special characters that are associated with a regular character. The user may modify a regular character to a special character by pressing the modifier key while the regular character is in close proximity with an insertion point (e.g. a cursor). For example, a regular character may be modified immediately after the regular character was inputted because the regular character is next to the insertion point. The regular character may also be modified even after other characters were input. For example, the user may move the insertion point next to the regular character and press the modifier key.

The user may modify a regular character to a desired special character by pressing the modifier key one or more times until the desired special character appears on the display. When the user presses the modifier key, a character input engine executing on mobile computing device 100 determines which of the special characters associated with the regular character should be inputted. Character input engine will be discussed in detail in conjunction with FIG. 3. Briefly stated, the character input engine determines which of the special characters associated with the regular character should be inputted by accessing a special character table.

Figure 3:
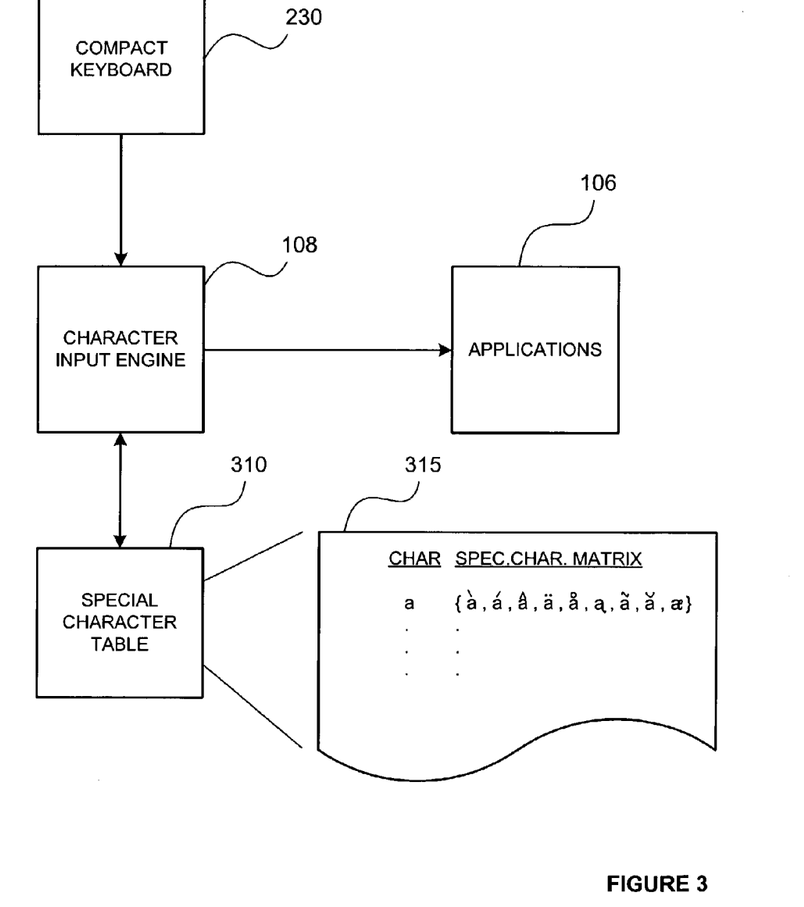
FIG. 3 is a schematic diagram of a character inputting system.

FIG. 3 is a schematic diagram of a character inputting system. Illustrated is a character input engine 108 that enables a user to input special characters using a compact keyboard 230. Data are generated in response to pressing keys on compact keyboard 230. The data include regular character identifiers and modifier key press identifiers. Character input engine 108 is configured to receive data generated by key presses on compact keyboard 230. Character input engine 108 may receive a regular character identifier that is generated when a key associated with the regular character on the compact keyboard is pressed. Character input engine 108 may also receive a modifier key press identifier that is generated when a modifier key on the compact keyboard is pressed. The modifier key press identifier identifies how many times the modifier key was pressed. Based on the regular character identifier and the modifier key press identifier, the character input engine may determine a special character identifier by accessing a special character table 310.

Special character table 310 is a table indexed by regular character identifiers. Each of the regular character identifiers may be associated with a special character matrix. A special character matrix may include one or more special characters associated with the indexing regular character identifier. The order of the special characters in the special character matrix corresponds to the modifier key press identifier (i.e. the number of times that the modifier key was pressed).

In operation, character input engine 108 may use the regular character identifier to locate a particular entry in the table where the regular character identifier is the index of the entry. Character input engine 108 may determine a special character identifier in the special character matrix that corresponds to the modifier key press identifier. For example, if the modifier key press identifier is 2 (i.e. the modifier key was pressed twice), the special character determined by character input engine 108 from exemplary entry 315 would be "á", which is the second character identifier in the matrix. After character input engine 108 determined a special character identifier, the special character identifier may be provided to applications 106. The special character identifier may also be displayed so the user knows which special character is being inputted. For example, in response to a modifier key press, the character input engine 108 may be configured to display the special character that corresponds to the modifier key press.

Below are other exemplary identifiers that may be used:

| Identifiers | Comments |
| --- | --- |
| lastChar | The regular character near the insertion point |
| Symbol[i][j] | Given a letter "i", and a number "j", special character [i][j] is the jth special character associated with a letter "i" |
| max(i) | The number of entries for a given row "i" |
| seq_index | A zero-based index in a sequence of modifier key presses. It determines how many times the modifier key has been pressed. |
| RKS | Reset keys set. When the modifier key is pressed, the lastChar is replaced (in place) with the first associated special character in the list. If the modifier is pressed again, the last char is replaced with the second special character and so on. The reset keys reset this sequence. E.g. RKS = {space, backspace, tab, enter, arrow keys} |

Figure 4:
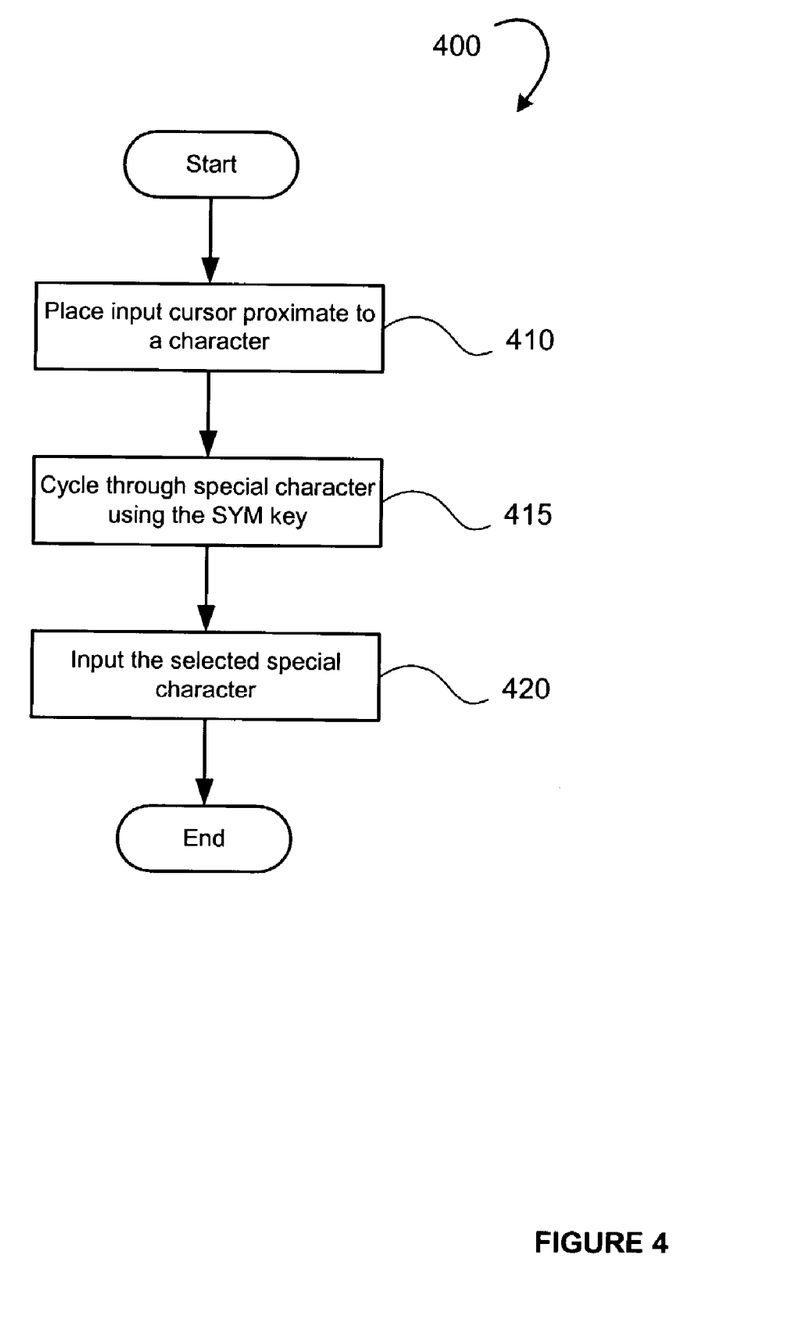
FIG. 4 is an exemplary process that may be used by a user to input a special character.
Figure 5:
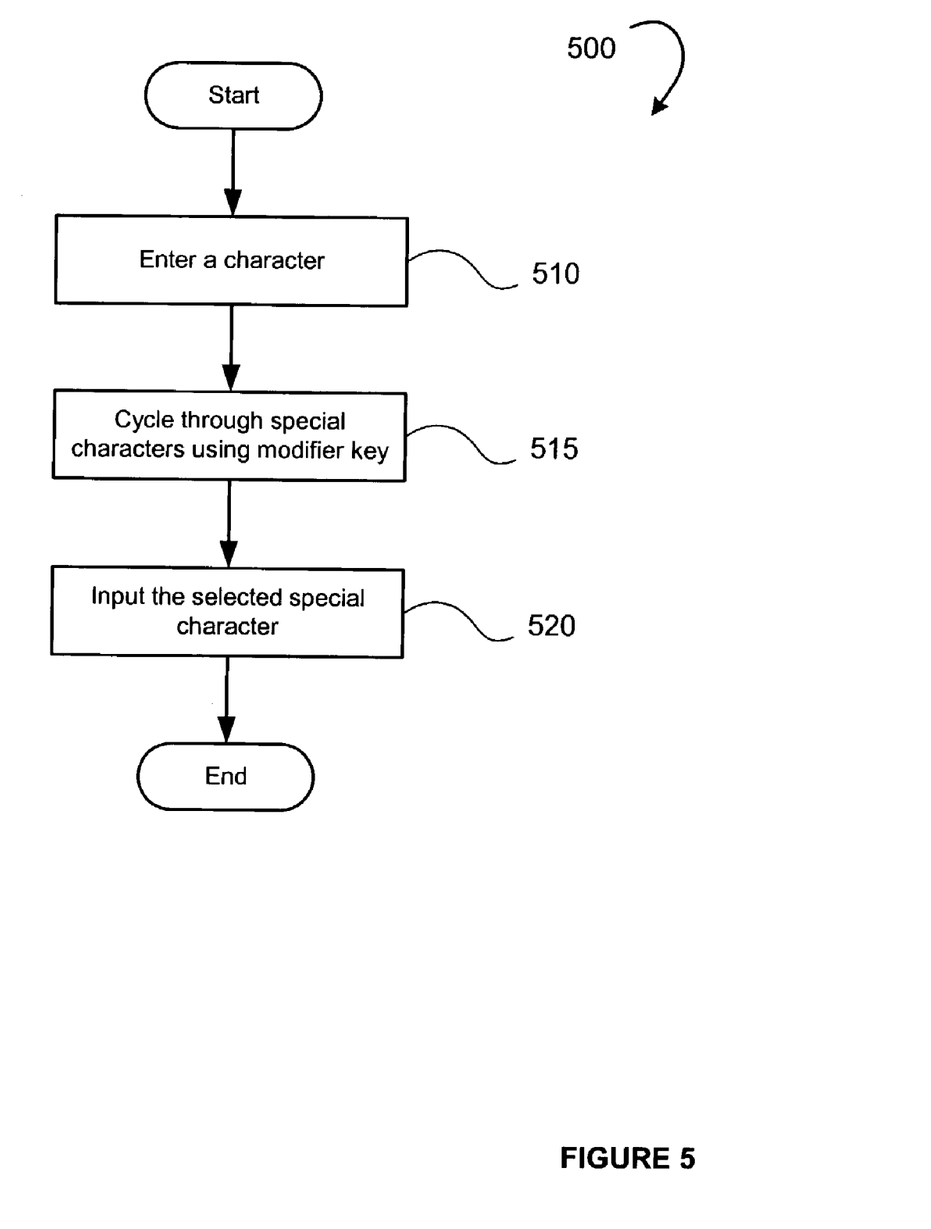
FIG. 5 is another exemplary process that may be used by a user to input a special character.

FIG. 4 is an exemplary process 400 that may be used by a user to input a special character. Moving from a start block, process 400 moves to block 410 where an input cursor is placed proximate to a character. The character may be a regular character or a special character. At block 415, the user may cycle through special characters associated with the character indicated by an input cursor. The user may press the modifier key on a compact keyboard until a desire special character appears. At block 420, the desire special character is inputted, which may be performed many different ways. For example, the special character may be inputted after a predetermined interval. The special character may also be input by pressing an input key. FIG. 5 is another exemplary process 500 that may be used by a user to input a special character. Process 500 is similar to process 400. Process 500 enables a user to input a special character immediate after a regular character has been entered without movement of the input cursor.

Figure 6:
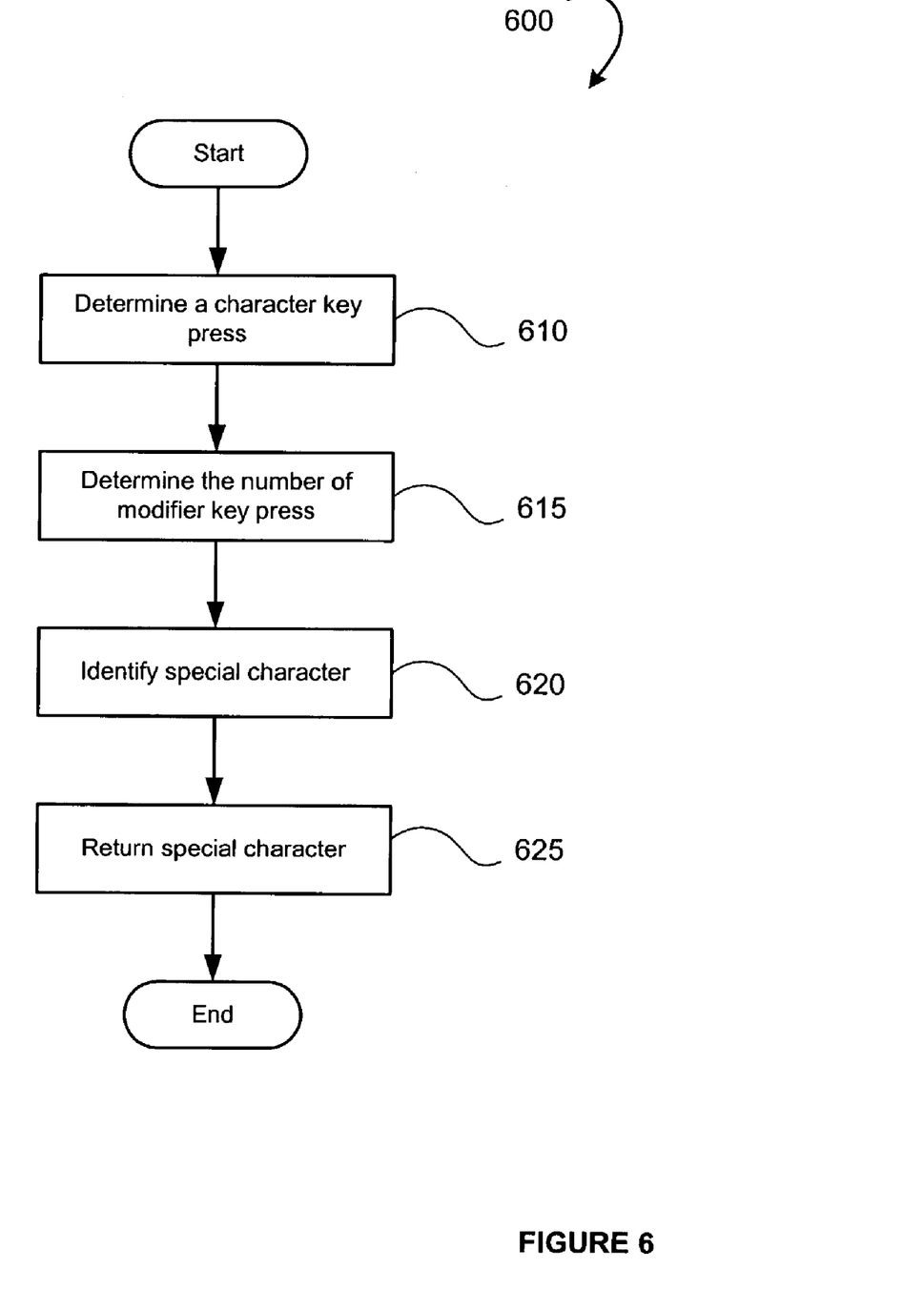
FIG. 6 is an exemplary process that may be used by a character input engine to return a special character.

FIG. 6 is an exemplary process 600 that may be used by a character input engine to return a special character. Moving from a start block, process 600 moves to block 610 where a character key press is determined. At block 615, the number of times the modifier key was pressed is determined. At block 620, a special character is determined based of the character key press and the number of times the modifier key was pressed. At block 625, the determined special character is returned.

The above specification, examples and data provide a complete description of the invention. Since many embodiments of the invention can be made without departing from the spirit and scope of the invention, the invention resides in the claims hereinafter appended.

What is claimed is:

1. A computer-implemented method for configuring a mobile computing device having an input component with keys, the computer-implemented method comprising:
    inputting a regular character generated in response to one of the keys being pressed, the key being associated with the regular character;
    displaying the regular character;
    selectively determining a special character from a set of at least three special characters in response to a number of times a modifier key being pressed after the regular character has been inputted, the modifier key is one of the keys of the input component; and
    modifying the inputted regular character to the special character.

2. The computer-implemented method of claim 1, wherein the special character is an accented character associated with the inputted regular character.

3. The computer-implemented method of claim 1, wherein determining the special character comprises changing the special character each time the modifier key is pressed.

4. The computer-implemented method of claim 1, further comprising in response to determining the special character, displaying the special character on a display screen.

5. The computer-implemented method of claim 1, wherein determining the special character includes determining a character proximate to a cursor as the inputted regular character.

6. The computer-implemented method of claim 1, wherein determining the special character is performed by referring to a special character table.

7. The computer-implemented method of claim 6, wherein the special character table includes entries indexed by regular characters and wherein at least one of the entries includes the special character indexed by the inputted regular character.

8. A method for inputting data into a computing device comprising:
    determining a special character; inputting and displaying a regular character by pressing a key on a keyboard, the key being associated with the regular character; and
    modifying the inputted regular character to the special character by selectively determining the special character from a set of at least three special characters in response to a number of times a modifier key is pressed after the regular character has been inputted.

9. The method of claim 8, wherein the special character is an accented character associated with the inputted regular character.

10. The method of claim 8, wherein modifying the inputted regular character includes repeatedly pressing the modifier key until the inputted regular character is modified to the special character; wherein each press of the modifier key changes the special character.

11. The method of claim 8, wherein modifying the inputted regular character is performed immediately after inputting the regular character.

12. The method of claim 8, further comprising moving a cursor to a location proximate to the inputted regular character before modifying the inputted regular character.

13. A computer-readable medium encoded with a data structure comprising:
- a first data field containing regular character identifiers, each regular character identifier identifying a regular character that corresponds to an input responsive to pressing a key on a keyboard; and
- a second data field containing entries, each entry being indexed to one of the regular character identified in the first data field, at least one of the entries including a special character identifier that identifies a special character from a set at least three special characters that corresponds to another input responsive to pressing a modifier key on the keyboard after pressing the key.

14. The computer-readable medium of claim 13, wherein the special character identified by the special character identifier in the second data field is an accented character associated with the regular character identified by the regular character in the first data field.

15. The computer-readable medium of claim 13, wherein at least one of the entries in the second data field contains at least two special character identifiers that wherein the order of the special character identifiers in the entry corresponds to the number of presses on the modifier key.

16. A computing device comprising:
- a display;
- a keyboard having keys associated with regular characters and a modifier key; and
- a memory encoded with a character input engine configured to respond to one of the keys being pressed by inputting the regular character associated with the key and that is configured to display the regular character on the display, the character input engine being further configured to respond to the modifier key being pressed after the regular character has been input by selectively determining a special character from a set of at least three special characters in response to a number of times a modifier key is pressed after the regular character has been inputted and modifying the inputted regular character to the special character and displaying the special character in place of the regular character.

17. The computing device of claim 16, wherein the special character is an accented character of the special character.

18. The computing device of claim 16, wherein the memory is further encoded with an operating system and wherein the character input engine is a component of the operating system.

19. The computing device of claim 16, wherein the memory is further encoded with an application and wherein the character input engine is a component of the application.

20. The computing device of claim 16, wherein the memory is further encoded with a special character table that associates regular characters with special characters and wherein the character input engine is configured to determining the special character by referring to the special character table.

21. The computing device of claim 16, wherein the computing device is a mobile computing device.

22. The computing device of claim 16, wherein the computing device is a portable communication device.

23. The computing device of claim 16, wherein the keyboard is a compact keyboard.

24. A mobile computing device configured to enable a user to input a special character related to a regular character by performing steps comprising:
- inputting the regular character by pressing a key on a keyboard configured on the mobile computing device, the key being associated with the regular character;
- displaying the regular character; and selectively determining a special character from a set of at least three special characters in response to a number of times a modifier key is pressed after the regular character has been inputted by pressing a modifier key on the keyboard after the regular character has been input.

25. The mobile computing device of claim 24, wherein the special character is an accented character associated with the regular character.

26. The mobile computing device of claim 24, wherein modifying the regular character includes repeatedly pressing the modifier key until the regular character is modified to the special character wherein each press of the modifier key changes the special character.

27. A mobile computing device comprising:
- means for a user to input a regular character;
- means for displaying the regular character;
- means for the user to selectively determining the special character from a set of at least three special characters in response to a number of times a modifier key is pressed after the regular character has been inputted; and
- means for inputting the special character.

28. The mobile computing device of claim 27, further comprising:
- means far displaying the special character when the user is selecting the special character.

* * * * *